E. C. KETCHUM.
ANTIFRICTION BEARING.
APPLICATION FILED AUG. 28, 1907.

900,860.

Patented Oct. 13, 1908.

2 SHEETS—SHEET 1.

Witnesses:
Howard Hauscom
Nathan C. Lombard

Inventor:
Ernest C. Ketchum,
by Walter E. Lombard,
Atty.

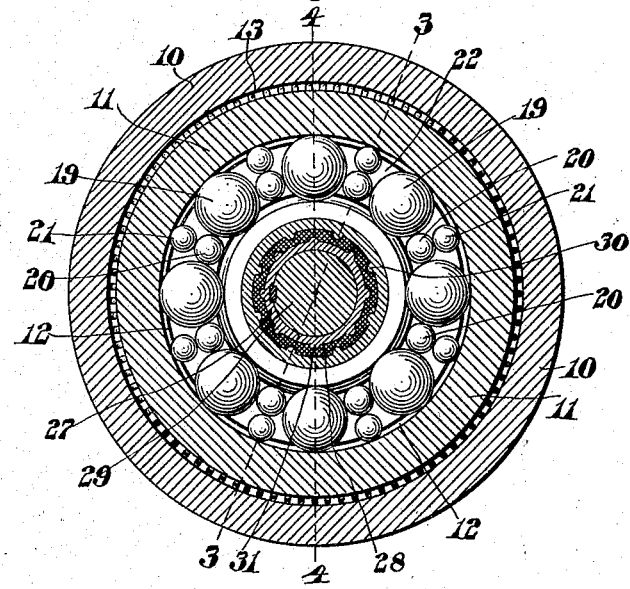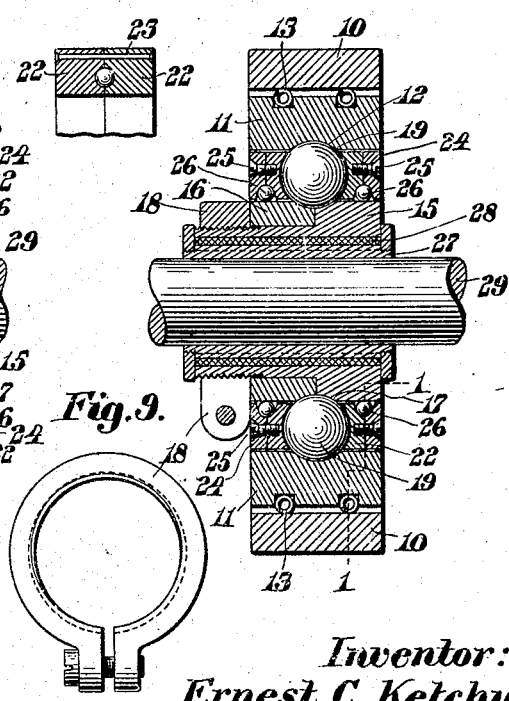

UNITED STATES PATENT OFFICE.

ERNEST C. KETCHUM, OF BOSTON, MASSACHUSETTS.

ANTIFRICTION-BEARING.

No. 900,860.      Specification of Letters Patent.      Patented Oct. 13, 1908.

Application filed August 28, 1907. Serial No. 390,479.

*To all whom it may concern:*

Be it known that I, ERNEST C. KETCHUM, a citizen of the United States of America, and a resident of Boston, in the county of Suffolk and State of Massachusetts, have invented certain new and useful Improvements in Antifriction-Bearings, of which the following is a specification.

This invention relates to anti-friction bearings and particularly to that class of anti-friction bearings in which the anti-friction members interposed between the racers have other smaller anti-friction members or separators interposed between every pair of larger members and it has for its object the production of such an anti-friction bearing which is provided with revoluble members interposed between the separators and the outer roller path, said separators and revoluble members interposed between them and the outer roller path being held in suitable position relative to each other and the main anti-friction members by means of a suitable cage.

The invention consists further in forming the racers of two portions between which is interposed an annular ring of yieldable material adapted to take up any sudden shock.

It consists further in certain novel features of construction and arrangement of parts which will be readily understood by reference to the description of the drawings and to the claims hereinafter given.

Figure 1:
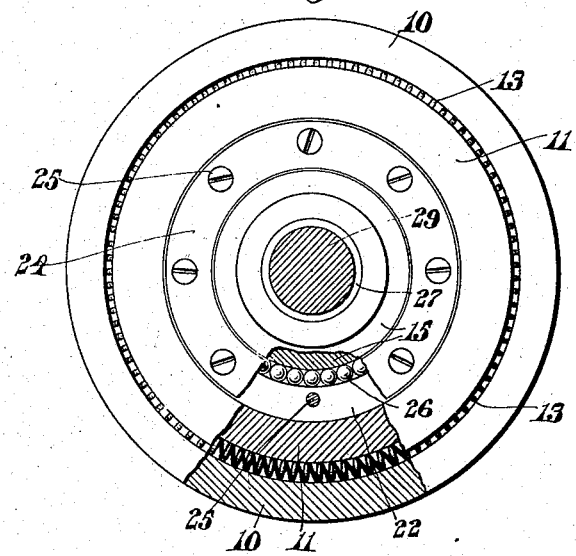
Figure 6:
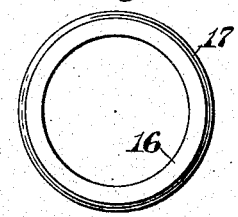
Figure 7:
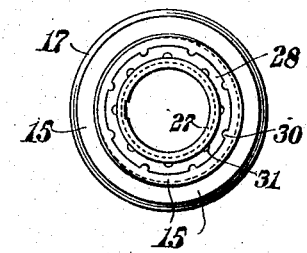
Figure 5:
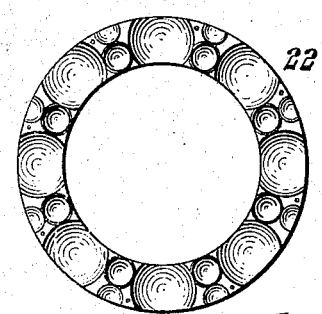

Of the drawings: Figure 1 represents an elevation partly in section of an anti-friction bearing embodying the features of this invention. Fig. 2 represents a section on line 2—2 on Fig. 3. Fig. 3 represents a section on line 3—3 on Fig. 2, the inner race-ring being shown in elevation. Fig. 4 represents a section on line 4—4 on Fig. 2. Fig. 5 represents an elevation of one of the parts of the cage for holding the anti-friction members. Figs. 6 and 7 represent end elevations of the two parts of the inner race-ring. Fig. 8 represents a section of a portion of the cage showing the means for securing the two parts together, and Fig. 9 represents an elevation of the locking nut for the inner race-ring.

Similar characters designate like parts throughout the several figures of the drawings.

In the drawings, 10 represents a part of the outer racer which has mounted within it the other part 11 of said racer, this member having on its inner circumferential face a roller path 12. Interposed between the parts 10 and 11 are spiral springs 13 or similar members of yieldable material which are adapted to take up any shock which may occur between the two parts of the outer racer.

The springs 13 are of sufficient tension and are mounted in suitable grooves in the part 11 of the outer racer in such a manner as to practically lock the two parts 10 and 11 together and prevent one from revolving relative to the other. Within the outer racer 10—11 is an inner racer 15 having a removable collar 16 which is held in position to form the roller path 17 by means of the locknut 18. Interposed between said outer and inner racers are a plurality of anti-friction members such as the balls 19 shown in the accompanying drawings, the bearing faces of which contact with the roller paths 12 and 17, respectively.

The anti-friction members 19 are separated by other smaller intermediate anti-friction members 20 which keep the anti-friction members 19 separated so that they cannot contact with each other and thereby cause a wearing of the surfaces thereof, the separators 20 insuring that the bearing faces of all of the anti-friction members and the separators when contacting shall move in the same direction.

It has been found in practice that, when anti-friction bearings are built under this plan and are revolved at very high speeds, great strain comes upon the cage for retaining the anti-friction members 20 in position intermediate the centers of the anti-friction members 19, the centrifugal action being such as to cause a tendency for said separators 20 to move outwardly and cause undue friction against the cage in which said members are supported. To obviate this difficulty anti-friction members 21 are interposed between the periphery of the separators 20 and the outer roller path 12, thereby effectually retaining the separators 20 in their proper relative positions intermediate the centers of the anti-friction members 19.

To prevent the members 21 from becoming displaced from a plane radial to the axis of the bearing passing through the center of the separators 20, rings 22 are provided on either side of the anti-friction members 19 and interposed between the outer and inner racers; said rings being connected together by suitable headed pins or similar fastening devices 23.

The rings 22 are provided with suitable pockets for the separators and the anti-friction members 19 and 21 which are adapted to retain these various members in proper position relative to each other. These pockets are somewhat larger in diameter than the anti-friction members contained therein so that the anti-friction members will simply be retained in position within the cage formed by the rings 22 secured together by means of the pins 23 and as a result reduce the bearing surface between the anti-friction members and the cage to a minimum. A plate 24 is secured by means of screws 25 to each face of the cage 22. Each plate 24 is chamfered off on its inner face while the outer face of the cage 22 is similarly chamfered off, the two chamfered portions of the plate 24 and the cage 22 forming a groove in which are mounted a plurality of balls 26 which bear upon the periphery of the inner racer members 15 and 16. This provides an anti-friction device which supports the cage and allows it to move freely upon the periphery of the inner race-ring 15 and 16 as the anti-friction members 19 are moved about the roller paths 12 and 17 on the outer and inner race-rings. The race-ring 15 is supported by a cylindrical hub 27 extending therethrough between the periphery of which and the inner cylindrical wall of the member 15 is interposed an annular bushing 28 of yieldable material which permits these parts to yield one upon the other under any sudden shock. This cylindrical hub 27 is keyed upon the shaft 29 and revolves therewith. The inner wall of the member 15 and the periphery of the cylindrical hub 27 are each provided with longitudinal projections 30 and 31 which bind the bushing 28 to these members and cause the whole to move together about the axis of the shaft 29.

In the operation of the device as one race-ring is revolved relatively to the other at a very rapid speed the tendency will be for the separators 20 to move outwardly by the centrifugal action and in an ordinary cage this tendency of the separator to move outwardly would cause considerable friction upon the cage which would finally result in the wearing of the cage so that the separators would be out of position and the bearing become to a certain extent inoperative or imperfect in its action. To prevent this and provide an effectual resistance for said outward movement is the prime object of the members 21 which are interposed between the outer roller path 12 and the separators 20, this member being sufficiently solid to resist any outward movement of said separators.

It is obvious that as the bearing face of the member 21 contacting with the outer roller path 12 or the separators 20 moves in the same direction as the faces of these members no undue wear will be caused by the frictional contact between the bearing surfaces. This makes a very effective roller bearing which reduces the friction to a minimum and is sufficiently solid to be capable for use in connection with devices revolved at a great speed such for instance as turbine engines, while at the same time the construction is such that there is no danger of a displacement of the various parts of the bearing during its rapid revolution.

It is believed the operation of the invention will be readily understood without further description.

Having thus described my invention, I claim:

1. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; and a revoluble member contacting with and interposed between each separator and the outer roller path, the axes of each separator and its coöperating revoluble member being radial to the axis of said roller bearing.

2. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; and means interposed between said separator and the outer roller path and in rolling contact with the latter adapted to retain said separator in position with the center of said separator in line with the centers of the anti-friction members between which it is interposed.

3. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; a revoluble member contacting with and interposed between each separator and the outer roller path, the centers of each pair of separators and revoluble members being in a line radial to the axis of said roller bearing; and means for retaining in proper relative position said separators and revoluble members.

4. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; a revoluble member interposed between each separator and the outer roller path; and annular members interposed between said rings and at either side of said anti-friction members and provided with means for retaining in proper relative position said separators and revoluble members.

5. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; a revoluble member interposed between each separator and the outer roller path; and annular members interposed between said rings and at either side of said anti-friction members provided with pockets for said separators and revoluble members.

6. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; a revoluble member interposed between each separator and the outer roller path; a cage interposed between said racers and supporting said anti-friction members and separators; and anti-friction members interposed between said cage and the inner ring.

7. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; a revoluble member interposed between each separator and the outer roller path; a cage interposed between said racers and supporting said anti-friction members and separators; plates secured to the outer faces of said cage; and anti-friction members held in position by said plates interposed between said cage and the inner ring.

8. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members; a revoluble member interposed between each separator and the outer roller path; a cage interposed between said racers and supporting said anti-friction members and separators; and anti-friction members interposed between said cage and one of said rings.

9. In a roller bearing, the combination of two rings movable relatively to each other and provided on adjacent circumferential walls with paths for anti-friction members; a plurality of anti-friction members interposed between said rings and adapted to revolve in contact with said paths; a ball between each pair of anti-friction members; and a revoluble member interposed between each ball and the outer roller path, the axes of each ball and its coöperating revoluble member being radial to the axis of said roller bearing.

10. In a roller bearing, the combination of two rings movable relatively to each other and provided on adjacent circumferential walls with paths for anti-friction members; a plurality of anti-friction members interposed between said rings and adapted to revolve in contact with said paths; a ball between each pair of anti-friction members; and a ball interposed between each ball and the outer roller path, the axes of each coacting pair of balls being radial to the axis of said roller bearing.

11. In a roller bearing, the combination of two rings movable relatively to each other and provided on adjacent circumferential walls with paths for anti-friction members; a plurality of anti-friction members interposed between said rings and adapted to revolve in contact with said paths; a separator between each pair of anti-friction members, the center of which is in line with the centers of the anti-friction members between which it is interposed; and a revoluble member interposed between each separator and the outer roller path, the axes of each separator and its coöperating revoluble member being radial to the axis of said roller bearing.

Signed by me at Boston, Mass., this 23d day of August, 1907.

ERNEST C. KETCHUM.

Witnesses:
   EDNA C. CLEVELAND,
   WALTER E. LOMBARD.